United States Patent [19]

Shapland

[11] Patent Number: 5,294,166

[45] Date of Patent: Mar. 15, 1994

[54] PROTECTIVE LINER FOR VEHICLE INTERIOR

[76] Inventor: Robert K. Shapland, 6033 34th St. W., #53, Bradenton, Fla. 34210

[21] Appl. No.: 24,515

[22] Filed: Mar. 1, 1993

[51] Int. Cl.⁵ .............................................. B62D 25/00
[52] U.S. Cl. ................................ 296/97.23; 297/229
[58] Field of Search ........................... 296/97.23, 1.1; 297/219; 15/238

[56] References Cited

U.S. PATENT DOCUMENTS

| | | | |
|---|---|---|---|
| 2,688,998 | 9/1954 | Erickson et al. | 297/219 |
| 3,823,058 | 7/1974 | Yamaguchi | 296/97.23 |
| 4,676,376 | 6/1987 | Keiswetter | 297/219 |
| 5,178,434 | 1/1993 | Krebs | 296/97.23 |

*Primary Examiner*—Robert R. Song
*Attorney, Agent, or Firm*—Ross, Howison, Clapp & Korn

[57] ABSTRACT

A protective liner (10) for a vehicle interior that comprises seat and floorboard portions (12, 14) that are preferably releasably connected by hook and loop fastening means (34A, 34B). The floorboard portion (14) of the subject liner (10) preferably further comprises laterally extending wing sections (26) adapted to provide protective coverage adjacent to the door threshold and the transmission or driveline tunnel of a vehicle.

4 Claims, 2 Drawing Sheets

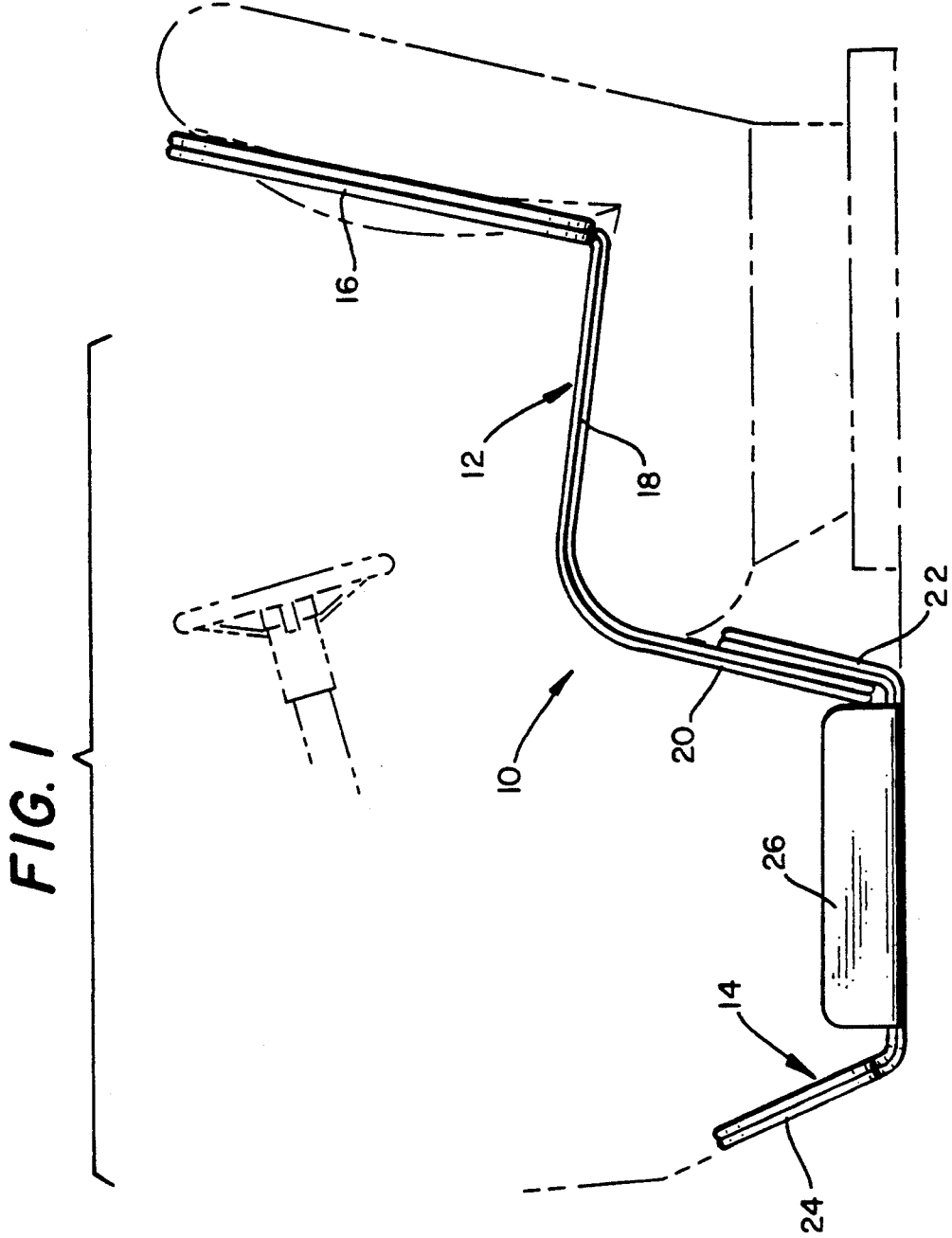

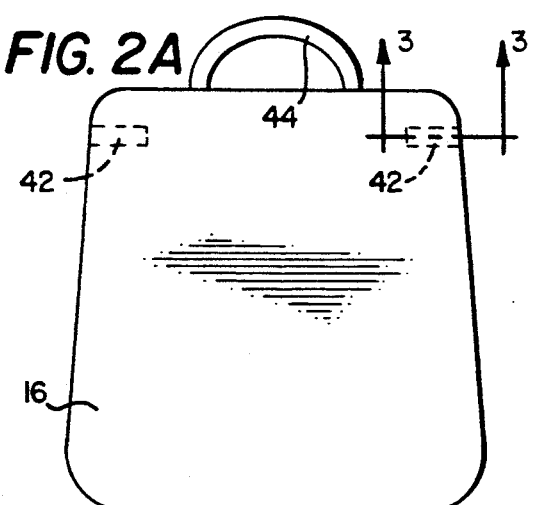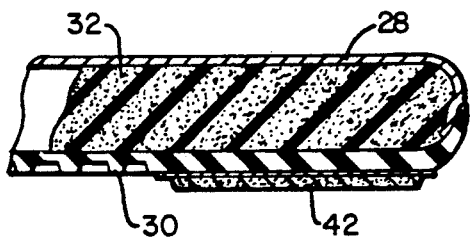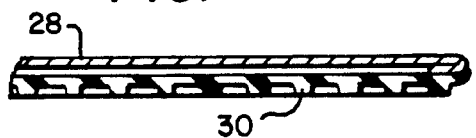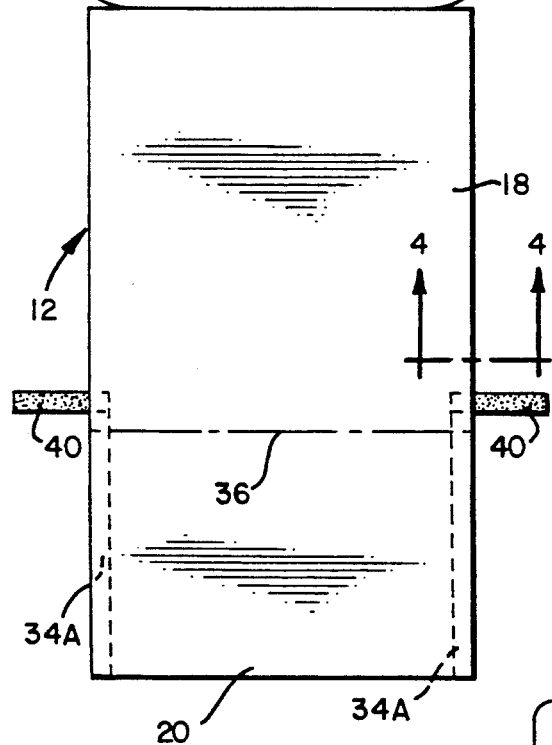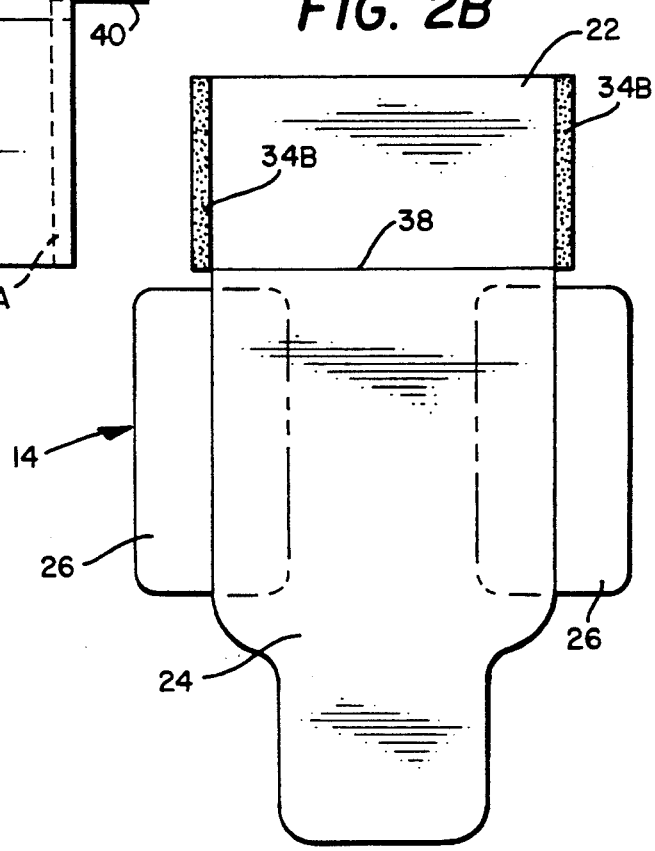

5,294,166

PROTECTIVE LINER FOR VEHICLE INTERIOR

BACKGROUND OF THE INVENTION

1. Field of the Invention

This invention relates to an OEM or aftermarket product useful for protecting the interior of vehicles such as automobiles and trucks from soiling, and more particularly, to a protective liner adapted to protect the seat and floorboards of a vehicle from soiling or contamination by mud, sand, grease, grass, pet hair and the like.

2. Description of Related Art

The use of removable floor mats in motor vehicles for protecting carpeting from soiling or contamination is well known. Such floor mats typically lie in the vehicle floorboards and can be easily removed for cleaning, in the case of heavy duty reusable floor mats, or disposal, in the case of disposable mats made of relatively lightweight products such as paper. One disadvantage of conventional floor mats is that they usually do not provide coverage in the threshold area between the doorway and floorboard, or along the side of the transmission tunnel. Both of these areas are likely to be contacted by the feet of the driver or passenger during ingress, egress or operation of the vehicle, causing contamination or soiling of the underlying carpet. Another disadvantage of conventional floor mats is that sand, gravel, or other loose particulate matter that is deposited on the mats during use is likely to slide off the mat and into the vehicle floorboard when the mat is removed from the vehicle for cleaning. Still another disadvantage of some conventional floor mats is that they are made of relatively high quality materials comparable to the underlying carpet, and are accordingly as difficult to clean as the underlying carpeting in the vehicle if they become soiled or otherwise contaminated by grass, pet hair, etc.

The use of seat covers for protecting the seating areas of vehicles from soiling or other contamination is also well known. Some conventional seat covers are disposable, being lightweight and adapted to temporarily protect seating surfaces from soiling such as, for example, when a vehicle is being serviced or repaired. Such seat covers are typically made of paper or plastic film, and simply lie across the seating surface, perhaps also extending upwards to cover at least part of the seat back. Other conventional seat covers are more permanent in nature, being designed to fit over and around the entire seat, and requiring more complicated installation procedures.

Even when the conventional, commercially available floor mats and seat covers are used in combination, however, users have experienced certain significant disadvantages. One disadvantage is the lack of coverage along the sides of the floorboard areas as discussed above. Another disadvantage is the uncovered area between the vehicle floorboard and the seating surface, where sand and the like can fall onto the floorboard and where grease or the like can be rubbed onto the front of the seat bottom from the legs of the occupant. This is especially likely if, for example, the occupant has been at the beach and is entering the vehicle with sand and/or suntan oil or lotion on his or her skin.

A protective liner is therefore needed for a vehicle interior that provides continuous protection for the seat and floorboard areas.

SUMMARY OF THE INVENTION

According to the present invention, a protective liner for a vehicle interior is provided that comprises seat and floorboard portions that are preferably releasably connected by hook and loop fastening means. The floorboard portion of the subject liner preferably further comprises laterally extending wing members adapted to provide protective coverage adjacent to the door threshold and the transmission or driveline tunnel of a vehicle.

BRIEF DESCRIPTION OF THE DRAWINGS

The apparatus of the invention is further described and explained in relation to the following figures of the drawings wherein:

FIG. 1 is a side elevation view of the protective liner of the invention as installed in a vehicle interior, with the steering wheel, seat and floorboard of the vehicle interior being shown in phantom outline;

FIG. 2A is a plan view of the seat portion of the protective liner of the invention;

FIG. 2B is a plan view of the floorboard portion of the protective liner of the invention;

FIG. 3 is a cross-sectional detail view taken along line 3—3 of FIG. 2A; and

FIG. 4 is a cross-sectional detail view taken along line 4—4 of FIG. 2A.

Like reference numerals are used to indicate like parts in all figures of the drawings.

DESCRIPTION OF THE PREFERRED EMBODIMENTS

Referring to FIGS. 1-4, protective liner 10 preferably comprises seat portion 12 and floorboard portion 14. Seat portion 12 preferably further comprises upper, middle and lower sections 16, 18, 20, respectively. Lower section 20 preferably functions as a downwardly extending skirt member for middle section 18. Floorboard portion 14 preferably comrpises upper, lower and wing sections 22, 24, 26, respectively. Depending upon the method and material of construction, the respective sections of seat portion 12 and floorboard portion 14 can be cut and fabricated separately and then joined to form seat portion 12 and floorboard portion 14, or can be cut and fabricated as a unitary member with fold lines differentiating the respective sections.

A significant structural feature of protective liner 10 of the invention is the means that are provided for releasably joining lower section 20 of seat portion 12 to upper section 22 of floorboard portion 14. In the preferred embodiment as shown in FIGS. 2A and 2B, hook and loop fastener strips 34A, 34B are provided along each side of lower section 20 and upper section 22, respectively to assist in releasably connecting seat portion 12 to floorboard portion 14. Hook and loop fastener strips 34A, 34B are desirably long enough that the extent of overlap between lower section 20 and upper section 22 can be selectively adjusted depending upon the height of the vehicle seat relative to the floorboard and according to whether the vehicle seat is moved forward or backward on its sliding track. The overlap between lower section 20 and upper section 22 when protective liner 10 is installed in a vehicle is shown in FIG. 1.

Although fold line 36 is visible in FIG. 2A, it is understood with reference to FIG. 1 that the fold between middle section 18 and lower section 20 may be very gradual, and that middle and lower sections 18, 20 can be made of a continuous piece of fabric, for example, without any clearly defined break point between the middle and lower sections. Similarly, fold line 38 between upper section 22 and lower section 24 of floorboard portion 14 can be a definite or indefinite line, depending upon the method and materials of construction and/or the configuration of the vehicle in which protective liner 10 is used.

Wing sections 26 ar desirably attached to lower section 24 of floorboard portion 14 along the side edges by stitching, gluing, heat sealing, or any other means suitable for the materials utilized. Alternatively, wing sections 26 can be cut together with lower section 24 as a single piece of material. During use of protective liner 10, wing sections 26 are desirably folded laterally outward to protect the door threshold and transmission or driveline tunnel areas from soiling or contamination. During removal of protective liner 10 from the vehicle, wing sections 26 are desirably folded inwardly to the alternate positions shown in phantom outline in FIG. 2B to help prevent sand, gravel, or other loose contaminants from falling off floorboard section 24 into the underlying or surrounding floorboard areas of the vehicle.

The principal material of construction for protective liner 10 can be selected from any suitable foldable material, examples of which include natural fabrics, synthetic fabrics, plastic sheet material, rubber, rubberized fabric, heavy paper, and the like. It is understood, however, that the materials of construction will depend upon the desired quality, price and intended service life of the product. Thus, for example, protective liner 10 can be made using leather as the principal material of construction if desired.

According to a particularly preferred embodiment of the invention, protective liner 10 comprises facing material 28 that is cotton canvas and backing material 30 that is rubber molded into a "waffle" styled surface configuration. Facing material 28 and backing material 30 are cut to the desired shape and attached to each other by any satisfactory means suitable for the materials employed, such as, for example, stitching, gluing, heat sealing, and the like. In the embodiment shown in FIG. 2A, upper section 16 comprises a polymeric foam layer 32 as shown in FIG. 3 between facing material 28 and backing material 30. Lower section 18, however, does not include the foam layer as shown in FIG. 4.

Alternatively, it will be appreciated that a foam layer can also be incorporated into lower section 18, or eliminated from upper section 16 without departing from the invention. Similarly, either upper section 16 or lower section 18 can be made without a waffle backing 30 if desired.

Fastening means such as Velcro ® strips 40, 42 are preferably provided, for example, to hold upper section 16 and middle section 18 together whenever protective liner 10 is removed from the vehicle for cleaning or storage. Means such as strap 44 are preferably provided for use as a carrying handle and/or to assist in supporting protective liner 10 from a hook or the like during cleaning outside the vehicle. Alternatively, strap 44 can be adapted to fit over or around a headrest in a vehicle to aid in supporting upper section 16 in an upright position when the occupant is entering or leaving the vehicle.

It will be appreciated upon reading this disclosure that the apparatus of the invention can be provided for a vehicle by an OEM manufacturer, or else supplied as an aftermarket product. Other alterations and modifications of the invention will become apparent to those of ordinary skill in the art upon reading the present disclosure, and it is intended that the scope of the invention disclosed herein be limited only by the broadest interpretation of the appended claims to which the inventor is legally entitled.

I claim:

1. A protective liner for a vehicle interior, the liner having a length and a width and comprising a seat portion covering a vehicle seat, a floorboard portion covering a portion of a vehicle floor in front of the vehicle seat, and means for releasably connecting the seat portion to the floorboard portion.

2. The liner of claim 1 wherein the means for releasably connecting the seat portion to the floorboard portion is selectively adjustable to vary the length of the liner.

3. The liner of claim 1 wherein the seat portion and floorboard portion each comprise hook and loop fastening means for releasably connecting the seat portion to the floorboard portion.

4. The liner of claim 1 wherein the floorboard portion further comprises foldable, laterally extendable wing sections.

* * * * *